Feb. 13, 1945.  A. L. THURSTON ET AL  2,369,420
COMPUTER
Filed June 23, 1943   2 Sheets-Sheet 1

INVENTORS
ARTHUR L. THURSTON AND
BEAUREGARD SWEENEY
BY
ATTORNEY

Feb. 13, 1945.  A. L. THURSTON ET AL  2,369,420
COMPUTER
Filed June 23, 1943  2 Sheets-Sheet 2

INVENTORS
ARTHUR L. THURSTON AND
BEAUREGARD SWEENEY
BY
ATTORNEY

Patented Feb. 13, 1945

2,369,420

UNITED STATES PATENT OFFICE 2,369,420

COMPUTER

Arthur L. Thurston, Wantagh, and Beauregard Sweeney, Great Neck, N. Y., assignors to Cox and Stevens Aircraft Corporation, a corporation of New York Application June 23, 1943, Serial No. 492,162

2 Claims. (Cl. 235—61)

Our invention relates to a mechanical computing device, and more particularly to a mechanical computing device wherein provision is made for determining the cumulative resultant of a plurality of known though independently variable factors. While the inventive concept is broadly applicable to a variety of problems, the device as herein shown is especially designed as an aid in properly distributing the load in an airplane to thereby obtain the desired aerodynamic balance.

The aerodynamic characteristics of the conventional airplane are such that it will be normally stable and controllable so long as its center of gravity (hereinafter designated C. G.) is located longitudinally between certain limits. There is also a fairly definite optimum longitudinal location of the C. G. for each of a number of flight regimes such as take-off, cruising, landing, etc. In the larger airplanes, with a disposable load capacity running into several tons—how to distribute the load so as to arrive at the desired C. G. location, or how or in what manner the various items of disposable load should be shifted to achieve the best load distribution, is a problem of considerable importance. The range, fore and aft, beyond which the C. G. location may be shifted is definitely limited. Any deviation from the optimum C. G. location tends to reduce flying efficiency, whereas excesses in such deviation may very conceivably so unbalance the airplane as to render it unsafe for operation.

The mathematical process of determining the C. G. location of a given system of weights is quite well known and simple. It consists essentially in dividing the algebraic sum of the moments of the weights about any convenient reference axis by the sum of the weights—the quotient being the distance from the reference axis to the C. G. of the system.

In the specific case of the airplane, the weight empty (including fixed equipment) and the location of the C. G. empty are known. The latter may be expressed as a moment about a stipulated reference axis. As items of disposable load are added, the moment of the weight of each item is added algebraically to the moment empty—and this sum divided by the total weight gives the distance of the C. G. of the loaded airplane from the reference axis. If the resultant C. G. is not as desired, the load must be shifted or redistributed and the new C. G. computed until the desired C. G. location is thus obtained.

The advantages of a mechanical computer of the type herein described are that it makes possible not only the ready determination of the C. G. location with a given distribution of load, but also a proper distribution of the load to obtain the desired C. G. location. It also incorporates means for indicating the desired C. G. location for any number of flight regimes as well as the safe permissible range of C. G. travel. A further advantage is that the coincident values of each factor as well as the cumulative resultant thereof are at all times visible and directly readable on a suitable chart.

Other objects and advantages of the invention will be hereinafter more fully set forth.

In the drawings, wherein like reference characters denote like or corresponding parts, Fig. 1 is a plan view of the device;

Figure 1:
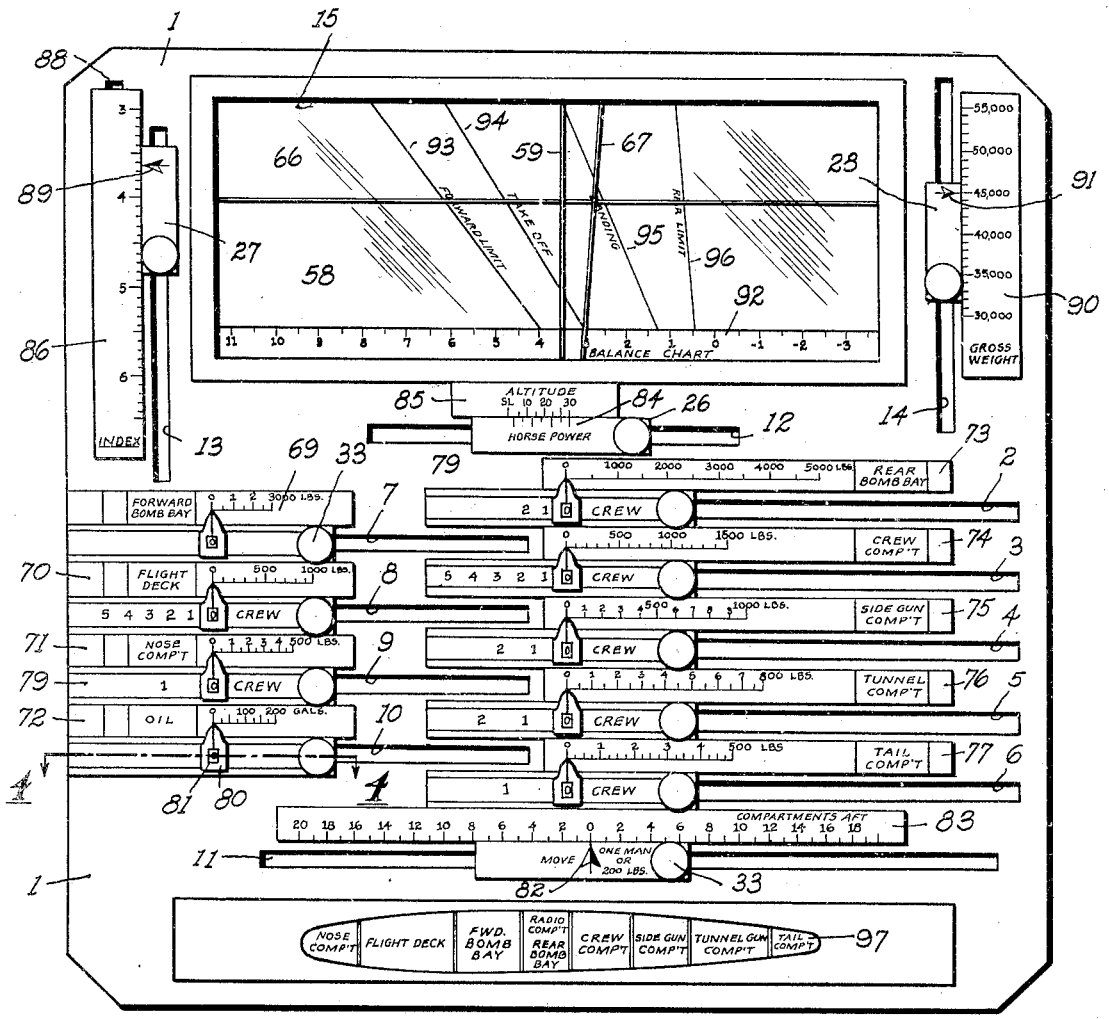
Figures 4, 5:
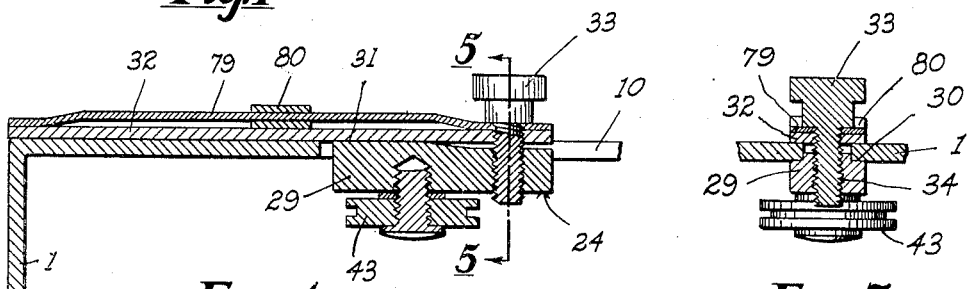

Figs. 4 and 5 are enlarged sectional views on the lines 4—4 and 5—5 of Figs. 1 and 4, respectively.

In the embodiment of the invention selected for illustration, a substantially rectangular body portion or frame member 1, preferably marginally flanged, is provided. In said frame 1 are cut a plurality of horizontally extending slots 2, 3, 4, 5, 6, 7, 8, 9, 10, 11 and 12; two vertically extending slots 13 and 14; and a large window opening 15. To and within each slot a slide member is fitted. These slide members are designated, respectively, 16, 17, 18, 19, 20, 21, 22, 23, 24, 25, 26, 27 and 28; slide member 16 being fitted to the slot 2; slide member 17 to the slot 3, and so on in the sequence indicated. Each slide member is manually movable along its associated slot, and each is capable of being clamped in any selected position of adjustment.

Each of the slide members 16 to 28, inclusive, comprises a block 29 rabbeted as at 30 to provide a raised portion 31 fitting the slot, and a plate 32. The raised portion 31 of each block, see Fig. 4, is slightly higher than the thickness of the frame for one-half the block length, but is cut down at one end so that a clamp screw 33 working in a tapped hole 34 in the end of each block may be manipulated to clamp the plate 32 to the frame and hence the slide in its adjusted position.

With the exception of slide member 26, each slide operating in a horizontal slot carries on its under side a freely rotating pulley. These pulleys, each of which is a single pulley, are designated respectively as 35, 36, 37, 38, 39, 40, 41, 42, 43 and 44. In addition to the slide-carried single pulleys 35 to 44, inclusive (mounted one each on the under side of each of the slide members 16 to 25, inclusive), there are eight fixed single pulleys 45, 46, 47, 48, 49, 50, 51 and 52 and three fixed so-called double pulleys 53, 54 and 55. Suitable blocks 56 are provided on the under side of the frame 1 to which the fixed pulleys are attached.

Also attached to the underside of the frame 1, but spaced therefrom by bushings 57, is a chart sheet or plate 58 around which a vertical wire loop indicator 59 extends. This indicator, it will be noted, is carried by a yoke 60 which in turn carries a so-called double pulley 61.

Perhaps the simplest way to describe the manner in which the various parts of the device are interconnected is to begin at the slide 27 where both ends of the funicular interconnecting element, i. e., the cord 62 (preferably a fishline cord or other suitable light and strong interconnection) are fastened. From the slide 27, the cord extends first over the lower pulley of the double pulley 53; thence over the lower pulley of the double pulley 54; and thence, in the order named, over the pulleys 42, 38, 43, 39, 51, 44, 50 and 49 to the lower pulley of the double pulley 55. From the latter pulley 55 it extends diagonally to the lower pulley of the double pulley 61, and after passing therearound, thence again (and again diagonally) to the double pulley 55—this time, however, to the upper pulley thereof. From the latter pulley 55 it is carried again (this time in a straight line) to the upper pulley of the double pulley 61, and thence, in the order named, over the pulleys 45, 46, 47, 35, 40, 36, 41, 37 and 54 (this time over but not around the upper pulley of the double pulley 54) until finally, after passing over the upper pulley of the double pulley 53, it returns to the slide 27 from whence it started.

The tensioning means for the cord 62 comprises a second cord 63 and a spring 64. This second cord is fastened at one end to the yoke 60 and is looped or passed around the fixed pulleys 48 and 52 and attached at its opposite end to the spring 64. Any suitable type spring, such as a spiral spring, may be employed. Where a spiral spring is used, one end thereof is anchored to the frame 1, as indicated at 65, by any suitable fastening. In such manner the cord 62 is at all times appropriately tensioned regardless of the adjustments accorded the various slide members around the pulleys of which the cord is looped or passed.

Figure 2:
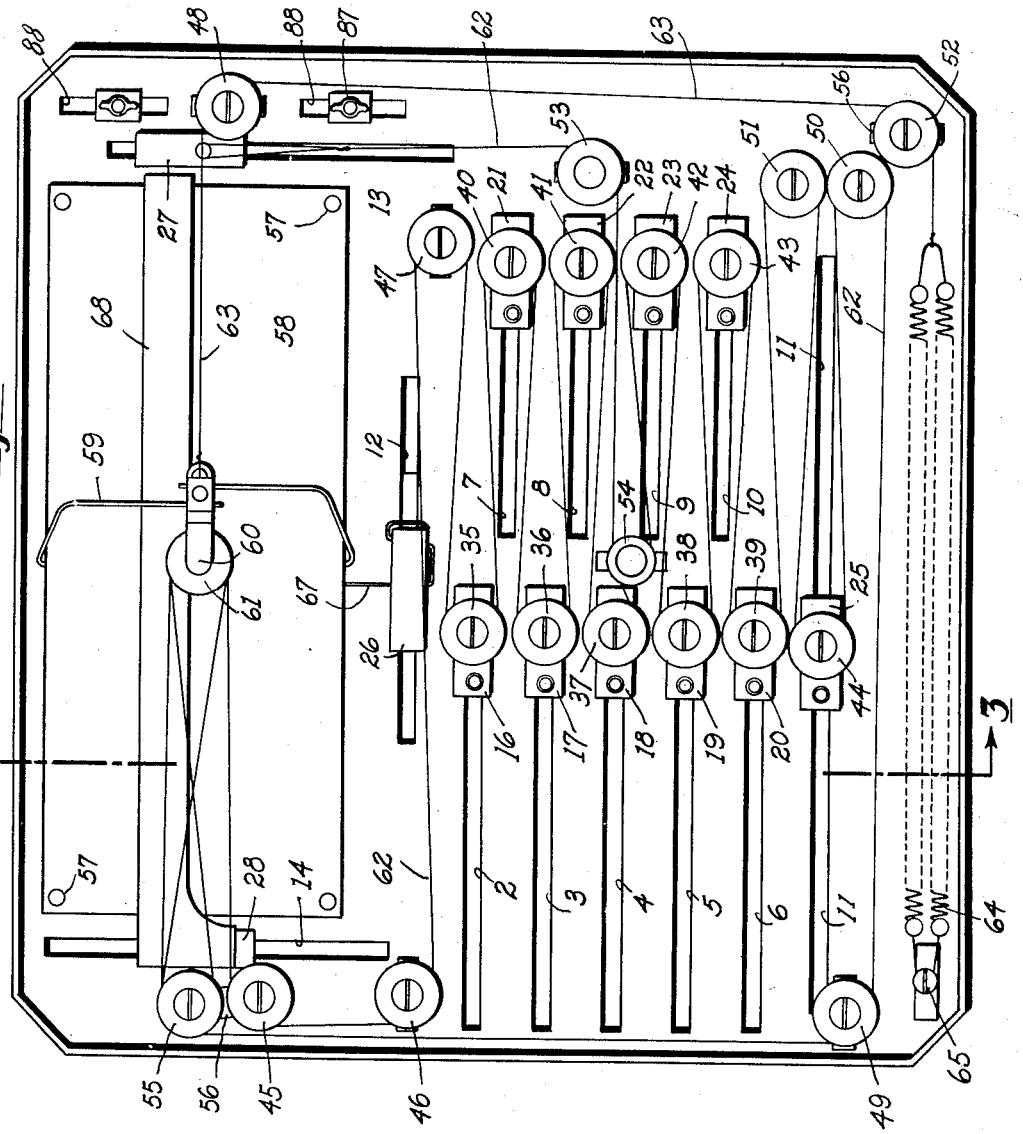
Fig. 2 is a view similar to Fig. 1 with the device inverted.
Figure 3:
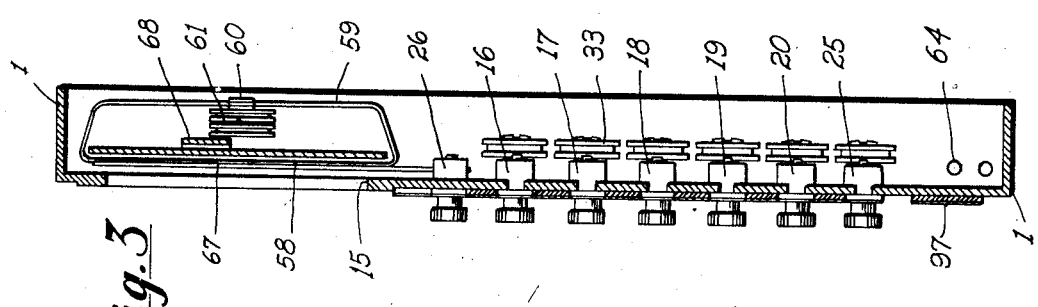
Fig. 3 is a sectional view on the line 3—3 of Fig. 2.

From the foregoing it is apparent that if one of the slide members, such as 16, or the slide member 27, is moved in its slot a given distance, the indicator 59 will be caused to move one-half that distance; that if any of the slide members 16, 17, 18, 19, 20 or 25 are moved to the left (Fig. 2), or any of the slide members 21, 22, 23 or 24 are moved to the right (Fig. 2) assuming that these are out of zero position shown in this figure, the indicator 59 will simultaneously move to the left and vice versa; and that if the slide member 27 is moved downward, such movement will cause the indicator 59 to move to the right (Fig. 2) and vice versa.

In addition to the indicator 59 there is also provided a so-called gross weight wire 66 and a so-called cruising wire 67. The former extends horizontally across the face of the chart 58 and is attached to a member 68 fastened to the under side of the slide member 28, whereas the latter, i. e., the wire 67, extends in a generally vertical direction over the face of the chart 58 and is attached to the slide member 26.

Reference will now be made to the various scales indicated in Fig. 1. The scales 69, 70, 71, 72, 73, 74, 75, 76 and 77 are weight scales and are fastened to the frame 1 immediately adjacent to and above the respective horizontal slots 2 to 10, inclusive. As illustrated in Fig. 4, each of the slide members 16 to 24, inclusive, has fastened to the plate 32 thereof a so-called crew-scale 79 around which is loosely folded a thin pointer member 80, in the top face of which a small window 81 is formed. Preferably, each crew-scale 79 is fastened to its associated plate 32 in a manner such that the pointer 80 thereof may be moved along its associated slide member for cooperation with a given scale of the series of weight scales 69 to 77, inclusive. The member 25, instead of being provided with a movable pointer such as characterizes the slide members 16 to 24, inclusive, is provided with a fixed index 82 adapted for cooperation with a scale 83. The member 26, on the other hand, is provided with a horsepower scale 84 adapted for cooperation with an altitude scale 85. Both scales 83 and 85 are carried by and fastened to the frame 1 in much the same manner as are the scales 69 to 77, inclusive.

To the left of the vertical slot 13 is an index scale 86 held to the frame 1 by clamp screws 87 fitting in slots 88 formed in the frame. This scale is vertically adjustable and is adapted for cooperation with a fixed index 89 carried by the slide member 27. To the right of the vertical slot 14 a gross weight scale 90 is fastened to the frame. This latter scale is adapted for cooperation with an index 91 on the slide member 28. The only other scale is the scale 92 provided on the chart 58 at the foot thereof and extending crosswise the large window opening 15.

Having identified and located the various scales, the method by which they are laid out may be briefly described as follows:

Scale 92 is a scale of moments about the reference axis in foot pounds times some power of ten—in the present example, ten thousand. The reference axis chosen for this example is the axis passing through the C. G. of the mean fuel load of the airplane so that the necessity for providing a slide member for this particular item of disposable load may be eliminated.

The weight scales 69 to 77, inclusive, are first laid out as moment scales at twice the scale of scale 92, after which the point on each weight scale corresponding to the moment produced by a given weight placed in the compartment of the airplane to which the scale applies, is inscribed on the scale member and the weight noted above the related scale marking.

To lay out the crew-scales 79 it is only necessary to measure off to the left of the zero marking, the distances representing the moments—to the same scale as for the weight scales—produced by one, two, three, four, etc., crew members weighing two hundred pounds each located in the applicable compartment.

The scale 83, hereinafter termed "rough balancing scale" is first laid out in moments to the same scale as the weight scales. The marks "1," "2," "3," etc., are then inscribed at the points on the scale corresponding to the moment change resulting from moving one crew member or two hundred pounds of load a distance equal to "1," "2," "3," etc., respectively, times the mean distance between the centers of adjacent compartments.

In laying out the index scale 86, moments to the same scale as those used for the weight scales are adhered to—the values running from somewhat less than, to appreciably more than, the moment empty, the lower value being at the upper end of the scale.

In laying out the gross weight scale 90 it is necessary to take into consideration the height of the large window opening 15. This scale is preferably so laid out that the range—from somewhat less than the weight empty to somewhat more than the maximum probable gross weight—would extend over the height of the window.

Except for the scales 83 and 84, the only other markings unaccounted for are the line markings 93, 94, 95 and 96 which appear on the chart 58 in Fig. 1. Line 93 is the so-called "forward limit" line; line 94 the "take-off" line; line 95 the "landing" line; and line 96 the "rear limit" line. These lines are so inscribed that the moment as represented by the abscissa on the moment scale 92 is directly in proportion to the weight as represented by the ordinate on the weight scale 90. They therefore represent lines of constant C. G. location—the lines 93 and 96 representing, respectively, the most forward and most rearward C. G. locations permissible, and the lines 94 and 95 representing, respectively, the optimum C. G. locations for take-off and landing.

For the layout of the altitude scale 85 and the horsepower scale 84, as well as for the selection of the slope of the cruising wire 67, test data and computations are required. As is well known to aerodynamicists, there is, for each angle of attack of a given airplane, a C. G. location about which the airplane will balance with its elevators in neutral position. This C. G. location is thus the optimum for cruising at that angle of attack. The variation of angle of attack with varying gross weight, airspeed and altitude, may be expressed as follows:

$$K = \frac{W}{\rho V^2}$$

wherein K equals a constant representing the angle of attack; W equals the gross weight; V equals the airspeed; and $\rho$ equals the atmospheric density representing the altitude.

Flight tests are conducted at various speeds and altitudes and with various gross weights. Loads are shifted until the airplane balances with the elevators neutral, and from a record of the final load distributions the corresponding C. G. locations are computed. From these data a curve of C. G. location against the value of K is obtained. During the tests, the relationship between horsepower and airspeed at various altitudes and with various gross weights is also obtained and recorded.

From the above data, and assuming various combinations such as sea level and 400 horsepower; sea level and 500 horsepower; 10,000 feet and 400 horsepower; 10,000 feet and 500 horsepower; the variation of C. G. location with gross weight is determined. A plot of the latter data is made on a work sheet of the same size and with the same moment and weight scales as the chart 58, and as an aid to plotting there is drawn on this work sheet a set of constant C. G. location lines similar to the lines 93, 94, 95 and 96.

The points corresponding to each of the combinations of altitude and horsepower are joined so that the plot, when completed, will be a series of lines, one for each combination of altitude and horsepower; all of which lines will be approximately straight and have the same general slope although not strictly parallel. The average slope is selected as the slope of the cruising wire 67 whereby the departure from strict precision is minimized.

When completed, the work sheet is held in place on the chart 58 with the moment and weight scales in register with the corresponding scales 92 and 90, respectively. Assuming an average horsepower (such as 500 B. H. P.), a mark is then made at about the middle of the horsepower scale 84 and so labelled. The slide 26 is then moved until the cruising wire 67 is approximately superposed on the line on the work sheet for the combination sea level and 500 horsepower and a mark labelled S. L. is made on the altitude scale 85 opposite the 500 horsepower mark on the horsepower scale 84. The slide 26 is then moved to cover in turn the lines for 5000 feet and 500 horsepower; 10,000 feet and 500 horsepower, etc., and the 5000 feet, 10,000 feet, etc., marks are made and labelled on the altitude scale in the same way.

In a similar manner the horsepower scale 84 is laid out by assuming an average altitude, such as 10,000 feet; moving the slide 26 to bring the cruising wire 67 in turn over the lines on the work sheet for the combinations of 10,000 feet and 400 horsepower; 10,000 feet and 600 horsepower, etc., and approximately marking the horsepower on the horsepower scale 84 opposite the 10,000 feet mark on the altitude scale 85.

Before the computer is ready for use, it is necessary to adjust it in the following way. All pointer members 80 are moved to the zero positions on their associated crew scales, and the slide members 16 to 24, inclusive, are then moved to bring these pointers to the zero markings on the associated weight scales. The lowermost slide member 25 is moved to bring the index 82 opposite the zero mark on its associated scale 83. The slide member 27, at the left of the large window opening 15, is moved to bring the index 89 opposite the known moment empty on the scale 86. The indicator wire 59 should then indicate the moment empty on the moment scale 92. If it does not, it should be adjusted approximately by taking in or letting out the cord 62 at its attachment to the slide member 27. The final adjustment is made by moving the slide member 27 until the indicator reads the exact moment empty on moment scale 92. The clamp screws 87 are then loosened, the index scale 86 is moved to bring the moment empty thereon opposite the index 89, and the clamp 87 again tightened. This adjustment may be made from time to time as the cord 62 stretches or shrinks.

Perhaps a better understanding of the device can be obtained from a description of its method of operation in solving an airplane balancing problem. With this in mind, and if not already so positioned, the slide member 27 is moved to bring the index member 89 opposite the moment empty on the index scale 86, and the slide member 25 moved to bring the index member 82 opposite the zero mark on the scale 83. The so-called weight manifest will set forth the disposable load to be carried in flight, and also the tentative locations of the various items of load, including the crew. With such information at hand, all pointer members 80 are moved to bring the window openings 81 over the numbers on the associated crew scales corresponding to the number of crew members proposed to be located in the various compartments of the airplane. The slide member clamps 33 are then loosened, and the slide members moved to bring the pointers 80 opposite the weights on the associated weight scales proposed for placement in the respective compartments—after which the clamps 33 are tightened as before. Having thus set the pointers 80, the slide member 28 is moved to bring the index 91 opposite the value on the scale 90 corresponding to the gross weight of the airplane with its proposed or contemplated load.

As the weight manifest will set forth the disposable load to be carried in flight, so will the so-called flight plan indicate the cruising altitude and the horsepower to be used. With such information available, the slide member 26 should be moved to bring these values on the scales 84 and 85 respectively opposite each other. Having so proceeded, the indicator 59 should then cross the intersection of the cruising wire 67 and the gross weight wire 66. Should it fail so to do, it is then necessary to redistribute or shift the disposable load until the desired intersection is obtained. The amount of shift required may be determined by manipulating the lowermost slide member 25. This can be accomplished by unclamping the slide and moving it to either the right or left until the indicator wire 59 is in the desired position. The index 82 will then show the distance—in terms of number of compartments—which one crew member or two hundred pounds must be shifted to achieve the desired balance. Obviously, if a shift of six compartments aft is indicated, the same result will be obtained by moving six crew members or twelve hundred pounds one compartment aft, or three crew members or six hundred pounds two compartments aft, etc. After the desired load shift has been decided, the slide 25 should be returned to its zero position and the balance checked by making the appropriate changes in the positions of the pointers 80 and slide members to indicate the revised or changed disposition of the load.

The optimum C. G. locations for take-off and landing are indicated on the chart 58 by the intersections of the gross weight wire 66 with the lines 94 and 95, respectively. These points will generally be respectively forward and aft of the cruising position of the C. G. Temporary shift of the C. G. to the take-off and landing optimum locations is most readily achieved by shifting the crew members, and the required extent of such shift is determined by use of the slide 25 as previously described.

The exigencies of operation may on occasion dictate some load disposition other than that determined to be the optimum. In such event, a determination nevertheless should be made of the C. G. location, answering such disposition, to insure that it does not lie beyond the intersection of the gross weight wire 66 with either of the extreme position lines 93 and 96 indicated on the chart.

As an aid to the user of the device or computer in visualizing the disposition of the various compartments provided in a given airplane, it is helpful if there be indicated, at some convenient location on the face of the frame 1, a representation of such airplane in which the various compartments are shown. A typical such representation is indicated at 97 in Fig. 1.

From the foregoing it is obvious that a mechanical computing device such as the one herein described has certain enabling advantages. Not only is it possible by its use to obtain any variable series of factors giving a desired predetermined answer, but in addition, one is enabled to (a) find the cumulative resultant of a series of given factors; (b) adjust any factor to bring the resultant to a desired value; (c) know at all times the value of each factor; and (d) estimate, in a single operation, the net shift in values to give the desired answer. Nor is it our intention to limit the use of the invention to the particular problem disclosed, for obviously a generally similar system of pulleys, interconnected as herein shown, may be employed in other and different problems from that for which the device here shown is designed.

In conclusion, it may be pointed out that a device or computer characterized as herein set forth is more or less inexpensive to manufacture, is extremely compact, light and strong, and may be, if desired, attractively encased in a suitable container to be carried in flight for use whenever and wherever occasion demands. Moreover, if desired, and as an added precaution, that portion of the chart 58 beyond the limit lines 93 and 96 may be colored red as indicative of what may be termed the danger zone.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a device for mechanically computing the load distribution factor of a multiple-load-compartment airplane; a frame, said frame having formed therein a plurality of slots, one for each said load-compartment; individually manually adjustable slide members mounted for sliding movement, one in each said slot, each said member being provided with an index and having mounted therein and movable therewith a pulley, and each said member by its independent sliding movement representing the magnitude of the effect of one compartment-load upon the center of gravity location of the airplane; a plurality of weight scales, one for each member, fastened to said frame and with which the member indices are adapted to respectively cooperate; a chart carried by said frame, said chart having indicated thereon markings representative of the center of gravity location of the airplane; an indicator movable across said chart accordingly as said slide members are independently moved to indicate in cooperation with the chart markings the cumulative effect of all of the compartment-loads on the center of gravity location of the airplane, said indicator having fastened thereto and movable therewith a pulley; other and further pulleys mounted to said frame; a single funicular connection laced over all said pulleys effective to move said indicator relatively to said chart accordingly as any one or all of said slide members is or are independently manually adjusted; means to releasably lock each said slide member in its adjusted position; and means for maintaining said funicular connection at all times taut.

2. In a device for mechanically computing the load distribution factor of a multiple-load-compartment airplane; a frame, said frame having formed therein a plurality of slots, one for each said load-compartment, and one in addition thereto; individual manually adjustable slide members mounted for sliding movement, one in each said slot, each said member being provided with an index and with a pulley and all but one of said slide members by its individual sliding movement representing the magnitude of the effect of one compartment-load upon the center of gravity location of the airplane, and the other by its sliding movement representing the cumulative effect on the center of gravity location of the airplane of shifting load from one compartment to another; a plurality of weight scales, one for each said member, fastened to said frame and with which the member indices are adapted to respectively cooperate; a chart carried by said frame, said chart having indicated thereon markings representative of the center of gravity location of the airplane; an indicator movable across said chart accordingly as each of the total number of slide members is independently adjusted to indicate in cooperation with the chart markings the cumulative effect of all of the compartment-loads as well as a shift of load from one compartment to another on the center of gravity location of the airplane, said indicator having fastened thereto and movable therewith a pulley; other and further pulleys mounted to said frame; a single funicular connection laced over all said pulleys effective to move said indicator relatively to said chart accordingly as any one or all of said slide members is or are independently manually adjusted; means to releasably lock each said slide member in its adjusted position; and means for maintaining said funicular connection at all times taut.

ARTHUR L. THURSTON.
BEAUREGARD SWEENEY.